US012782241B2

(12) United States Patent
Lee et al.

(10) Patent No.: US 12,782,241 B2
(45) Date of Patent: Nov. 3, 2026

(54) APPARATUS AND METHOD FOR STATUS DIAGNOSIS OF MACHINE TOOLS

(71) Applicant: Electronics and Telecommunications Research Institute, Daejeon (KR)

(72) Inventors: Munyoung Lee, Daejeon (KR); Sung Jae Yoon, Daejeon (KR); Jung-Chan Na, Daejeon (KR); Jeong Hwan Lee, Daejeon (KR); Seung Hyub Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 690 days.

(21) Appl. No.: 18/193,346

(22) Filed: Mar. 30, 2023

(65) Prior Publication Data

US 2023/0314282 A1 Oct. 5, 2023

(30) Foreign Application Priority Data

Mar. 30, 2022 (KR) ........................ 10-2022-0039674

(51) Int. Cl.
*G06F 11/30* (2006.01)
*G01M 99/00* (2011.01)
*G05B 13/02* (2006.01)

(52) U.S. Cl.
CPC ....... *G01M 99/005* (2013.01); *G05B 13/0265* (2013.01)

(58) Field of Classification Search
CPC .................................................. G01M 99/005
See application file for complete search history.

(56) References Cited

U.S. PATENT DOCUMENTS

2013/0067283 A1 3/2013 Lee et al.
2014/0303796 A1 10/2014 Jeong et al.
2021/0133607 A1 * 5/2021 Stubbs .................. G06N 20/00

FOREIGN PATENT DOCUMENTS

JP 2010149206 * 7/2010
JP 2010149206 A 7/2010
JP 2018138327 A 9/2018
JP 2019093463 A 6/2019
KR 1020180048218 A 5/2018
KR 102333457 B1 12/2021

* cited by examiner

*Primary Examiner* — Phuong Huynh
(74) *Attorney, Agent, or Firm* — Rabin & Berdo, P.C.

(57) ABSTRACT

In order to increase the accuracy of status or failure diagnosis of machine tools and reduce the time and costs required for data collection and algorithm development for diagnosis, sensors are mounted on specific elements of the machine tools and measurement data is collected while operating under the specific operating conditions during a time interval between one machining operation and another machining operation to perform status or failure diagnosis of the machine tools. According to the present invention, by using data collected while operating machine tools under the predefined specific conditions using a time interval between one machining operation and another machining operation, it is possible to more accurately perform diagnosis while allowing less noise to be mixed in the data and reducing the time required for data collection for the development of diagnostic algorithm.

10 Claims, 3 Drawing Sheets

APPARATUS AND METHOD FOR STATUS DIAGNOSIS OF MACHINE TOOLS

CROSS-REFERENCE TO RELATED APPLICATION

This application claims priority to Korean Patent Application No. 10-2022-0039674, filed on Mar. 30, 2022, in the Korean Intellectual Property Office, the disclosure of which is incorporated herein by reference in its entirety.

BACKGROUND

1. Field of the Invention

The present invention relates to status or failure diagnosis and machine learning or artificial intelligence technology for machine tools or the like.

2. Discussion of Related Art

A machine tool is a machine that performs machining operations for materials to generate various desired shapes. A machine tool includes computer numerical control (CNC) that performs numerical control by a computer to operate automatically according to set code, a rotation system (e.g., spindle) that performs machining operations for materials while rotating after workpieces or tools are attached thereto, a feed system that moves work parts of the machine tools to precise positions, and the like.

There are studies that perform diagnosis (machine learning-based diagnosis, deep learning-based diagnosis, artificial intelligence-based diagnosis, statistical analysis-based diagnosis, etc.) using collected data after mounting vibration sensors and current sensors to diagnose a status or failure of machine tools. However, since the machine tools processes machining operations for different materials into different shapes (e.g., workpiece A is processed into a sphere and workpiece B is processed into a regular hexagon), it takes a long time and high costs to collect and analyze data and develop diagnostic algorithms (artificial intelligence models, etc.) considering all kinds of machining. In addition, since a large amount of noise is mixed in data collected during machining operation and there are various machining patterns, there is a limit in the accuracy of diagnosis.

SUMMARY OF THE INVENTION

The present invention is directed to increasing the accuracy of diagnosing a status or failure of machine tools and reducing the time and costs required for data collection and algorithm development for diagnosis.

To achieve the above object, according to the present invention, sensors (e.g., a vibration sensor, a current sensor, a temperature sensor, a sound sensor, a displacement sensor, etc.) are mounted on specific elements (e.g., a spindle, a feed system, a driving system, etc.) of machine tools and measurement data is collected while operating under the specific operating conditions (e.g., idling a spindle at a specific speed) during a time interval between one machining operation and another machining operation to perform status or failure diagnosis of the machine tools.

According to an aspect of the present invention, there is provided a method of status diagnosis of a machine tool including: driving an element to be measured of the machine tool during a time interval between a first machining operation and a second machining operation of a machine tool; collecting data from a sensor mounted on the element to be measured; and performing status diagnosis of the machine tool based on the collected data.

According to another aspect of the present invention, there is provided an apparatus for status diagnosis of a machine tool including: a control unit configured to drive an element to be measured of the machine tool during a time interval between a first machining operation and a second machining operation of a machine tool; a data collection unit configured to collect data from a sensor mounted on the element to be measured; and a diagnostic unit configured to perform status diagnosis of the machine tool based on the collected data.

The spirit of the present invention described above will become more apparent through specific embodiments to be described below with reference to drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Terms used in the description below are for explaining embodiments rather than limiting the present invention. Unless otherwise stated, a singular form includes a plural form in the present specification. In addition, the term “including (comprise, comprising, or the like)” used herein denotes the presence of stated components, steps, operations, and/or elements and does not preclude the presence or addition of one or more other components, steps, operations, and/or elements.

Figure 1:
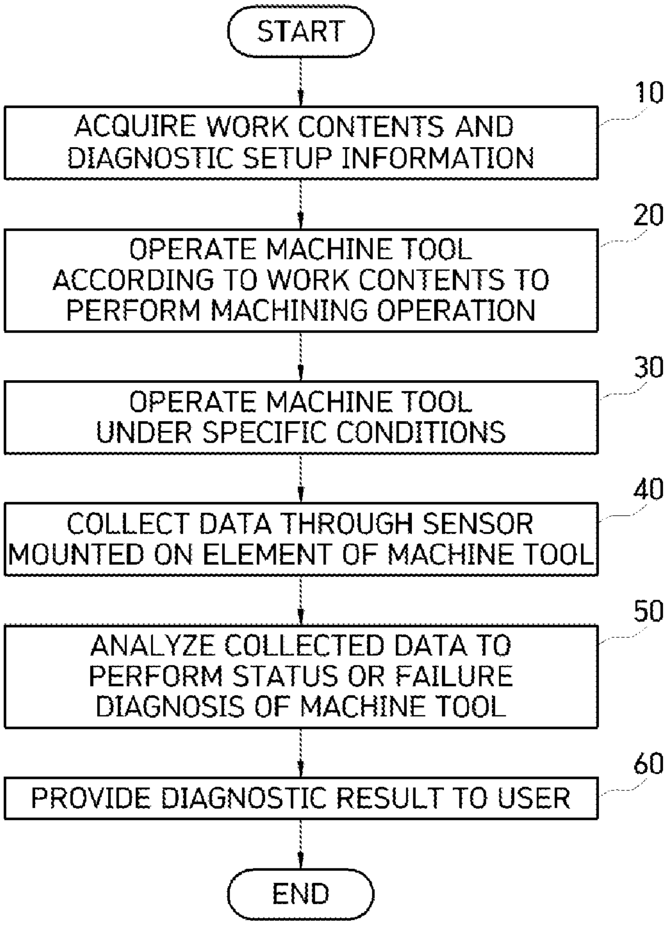
FIG. 1 is an operation flowchart for describing a concept of an apparatus and method for status diagnosis of machine tools of the present invention.

FIG. 1 is an operation flowchart for describing a concept of a method of status diagnosis of machine tools of the present invention.

First, single or multiple work contents and diagnostic setup information are acquired (10). The work contents and the diagnostic setup information may be input by a user or be stored during the manufacture of machine tools (for example, various preset menus). For example, the work contents may be a command(s) instructing machining operation(s) inherent in the machine tools, such as “perform an operation of cutting materials to be machined to a depth of 3 mm twice”, etc. The diagnostic setup information may include a diagnostic reference value (e.g., insensitive, normal, sensitive, etc.) which is a criterion for status or failure diagnosis, operating conditions for collecting sensor data (e.g., idling the spindle of the machine tool at 2000 RPM during the time interval between the first machining operation, and the second machining operation, etc.), and time interval values between machining operations.

According to the work contents, the machine tool is operated to perform the machining operation corresponding to the work contents (20).

The machine tool is operated according to operating conditions for sensor data collection included in the diagnostic setup information (30). For example, during the time interval between the first machining operation and the second machining operation, the spindle of the machine tool is made to idle at 2000 RPM.

Data obtained by measuring specific parameters (e.g., vibrations, chattering, current consumption, etc.) of specific elements (e.g., spindle, feed system, driving system, etc.) of a machine tool is collected from sensors (e.g., vibration sensor, current sensor, sound sensor, etc.) previously mounted on such specific elements of the machine tool (40). The vibration sensor may measure the vibrations, chattering, and the like of the corresponding element to diagnose the status of the element such as a main shaft or feed system of the machine tool. The current sensor may measure current consumption to check a load of elements relating to motors. The sound sensor may measure noise, sound waves, and the like during operation. In addition, a temperature sensor may measure the temperature, thermal displacement, and the like of a specific element or structure.

The collected measurement data is analyzed using a diagnostic algorithm to diagnose the current status or failure of the machine tool (50), and provides a diagnostic result to a user (60). The diagnostic algorithm for analysis of measurement data may be deep learning, machine learning, artificial intelligence models, or statistical analysis techniques. In addition, the diagnostic result provided to the user may be a visual display or messaging or an audible warning alarm.

Hereinafter, an embodiment embodying the concept of the apparatus and method for status diagnosis of machine tools according to the present invention described above will be described.

Figure 2:
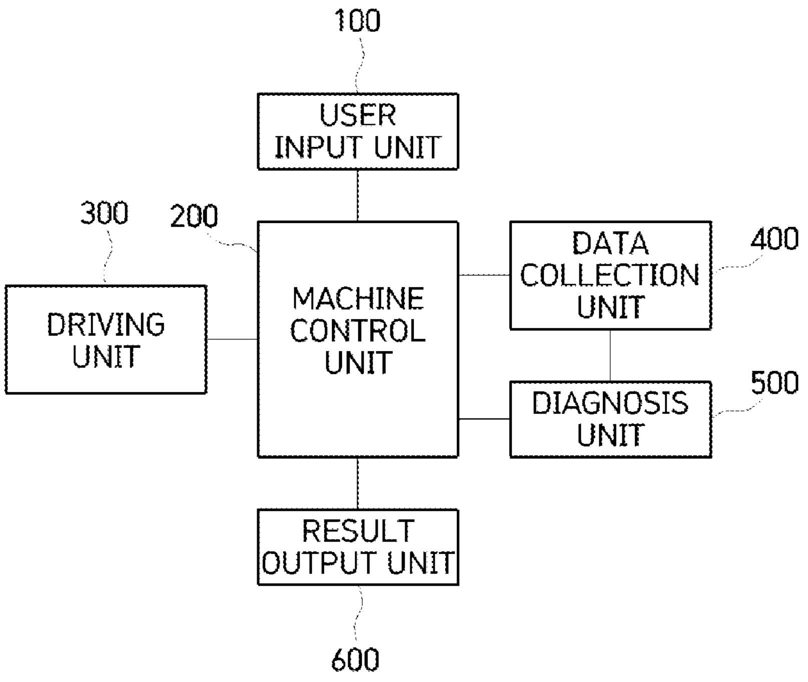
FIG. 2 is a configuration diagram of an apparatus for status diagnosis of machine tools according to an embodiment.

FIG. 2 illustrates a configuration of an apparatus for status diagnosis of machine tools according to an embodiment of the present invention. The apparatus largely includes a user input unit 100, a machine control unit 200, a driving unit 300, a data collection unit 400, a diagnosis unit 500, and a result output unit 600. In this embodiment, as a target machine for status or failure diagnosis, an example of a machine tool was described, but the present invention can also be applied to another machine (a rotary machine or the like) that performs similar operations.

The user input unit 100 serves to allow a user operating a machine to input single or multiple work contents and input diagnostic setup information such as operating conditions for collecting sensor data to diagnose status or failure during time intervals between machining operations or a time interval value between machining operations. For example, the user may input a plurality of work contents to "perform the first machining operation of cutting materials to a depth of 3 mm twice, and then the second machining operation of processing the material into a sphere (ball) shape once", and diagnostic setup information including the operating conditions for sensor data collection, such as "idling the spindle of the machine tool at 2000 RPM during the time interval between the first machining operation and the second machining operation," and a time interval value between operations such as "the interval between operations is 1 minute." The diagnostic setup information may also include a diagnostic reference value (e.g., insensitive, normal, sensitive, etc.) or a diagnostic execution cycle (e.g., 1-hour interval) which is a criterion for status or failure diagnosis. In another embodiment, when various preset menus are set during the manufacture of the machine tool (or shipped from a factory), the user input unit 100 may be designed so that a user may select a present menu from among the preset menus.

The machine control unit 200 performs overall operation control and diagnosis control of the machine tool. The machine control unit 200 includes an original computer numerical control (CNC)-related unit that performs numerical control by a computer and a unit that controls diagnosis according to the present invention. For example, when performing the status or failure diagnosis of the spindle element of the machine tool between the first machining operation and the second machining operation according to the work contents received from the user input unit 100, the machine control unit 200 instructs the driving unit 300 to operate the machine tool under the operating conditions for data collection (e.g., idling the spindle at 2000 RPM), and instructs the data collection unit 400 to collect vibration measurement data from the vibration sensor mounted on the spindle of the machine tool. The machine control unit 200 also controls the diagnosis unit 500 to perform the status or failure diagnosis using the collected data and transmit the diagnostic result to the result output unit 600. A command to perform the diagnosis during the time interval between the respective machining operations can be implemented through the G code of the CNC or the like.

The driving unit 300 drives elements such as a motor, a rotation shaft, a feed shaft, etc. of the machine tool so that the machine tool actually operates. For example, when a user inputs work contents such as "Cut materials to a depth of 3 mm twice," the driving unit 300 drives the feed shaft and the rotation shaft to perform machining operations for materials according to the work contents.

The data collection unit 400 serves to collect data measured by the sensors (a vibration sensor, a current sensor, a sound sensor, etc.) mounted on the main elements (a spindle, a feed system, a driving system, etc.) of the machine tool, and transmit the collected data to the diagnosis unit 500. For example, the vibration data is collected through the vibration sensor mounted on the rotating system element (the spindle or the like) of the machine tool and transmitted to the diagnosis unit 500. The data collection unit 400 may perform pre-processing of data to meet the signal rating required by the diagnosis unit 500 before transmitting the collected data to the diagnosis unit 500.

The diagnosis unit 500 performs the status or failure diagnose of the machine tool using the data that is received through the data collection unit 400 and collected during the time interval between the machining operations from the sensor mounted on the element to be measured of the machine tool. The diagnosis unit 500 may diagnose the current status or failure of the machine tool by analyzing the collected data using a conventional diagnostic algorithm. The information (diagnostic result) diagnosed by the diagnosis unit 500 may be transmitted to the machine control unit 200. Conventionally, there is a problem in that a large amount of noise is mixed with the data collected during the original machining operation (cutting, etc.), and various machining patterns are present depending on a material or shape to be machined, resulting in poor diagnostic accuracy. However, in the proposed present invention, since data is collected by operating the machine tool under predefined specific operating conditions (e.g., idling the spindle at 2000 RPM) during the time interval between the machining operations, it is possible to obtain more accurate diagnostic results while shortening the time required for data collection with less noise.

The diagnosis unit 500 may additionally generate and update a diagnostic algorithm as well as use the conventional diagnostic algorithm. To generate the diagnostic algorithm, an initial diagnostic algorithm is implemented as an artificial intelligence model, and the data collected from the sensor is stored in a database (DB) and used as training data to continuously train the artificial intelligence model and generate, and update, the diagnostic algorithm. In the early stage that the amount of collected data is small, a sufficient amount of training data has not yet been accumulated, and so the diagnostic function is performed with an algorithm generated from data collected from other machines. However, as the collected data accumulates, the diagnostic algorithm continues to evolve, so diagnosis may be performed using a self-diagnostic algorithm. Various existing techniques such as machine learning, deep learning, artificial intelligence, and statistical analysis may be used to generate the diagnostic algorithm.

Figure 3:
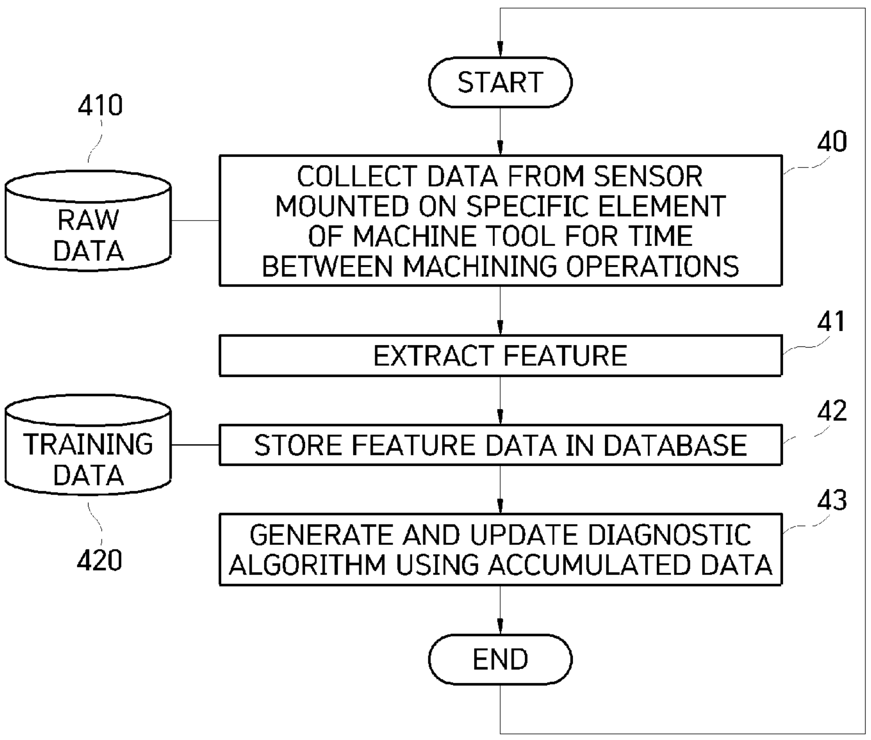
FIG. 3 is a flowchart illustrating a method of generating a diagnostic algorithm.

FIG. 3 is an operation flowchart of generating a diagnostic algorithm that may be included in the diagnosis unit 500 (or may not be included in the diagnosis unit 500 as an independent unit).

First, as illustrated in FIG. 1, during the time interval between the first machining operation and the second machining operation of the machine tool, data is collected through the sensor (e.g., the vibration sensor, the current sensor, the sound sensor, etc.) mounted on the specific element (e.g., the spindle, the feed system, the driving system, etc.) of the machine tool (40). In this case, the collected data may be stored in a raw data DB 410. Subsequently, pre-processing of data such as feature extraction is performed on the collected data (41). The pre-processing of data is a process for making the collected data into learning (training) data. The training data is stored and accumulated in a training data DB 420 (42). The pre-processing generates a diagnostic algorithm (an artificial intelligence model or the like) based on the accumulated training data and stores the generated diagnostic algorithm in the database for the purpose of improvement and update. The diagnostic algorithm is generated by the accumulated training data, and performance is improved by learning (43). The diagnostic algorithm evolves according to the accumulation of data, and thus the performance of inferring (diagnosing) the status or failure of the machine tool should be improved.

Returning to FIG. 2, the result output unit 600 outputs the diagnostic result, that is, the current status or failure information of the machine tool, which is diagnosed by the diagnosis unit 500 and transmitted to the machine control unit 200, and provides the diagnostic result to the user. The result output unit 600 may utilize a display screen of the CNC device mounted on the machine tool, or may be implemented as a separate display device. In this embodiment, the result output unit 600 basically receives and outputs the diagnostic result from the machine control unit 200, but according to another embodiment, in order to reduce the load on the machine control unit 200 that has to simultaneously perform many tasks, the result output unit 600 may be implemented to directly receive and output the diagnostic result from the diagnosis unit 500. The result output unit 600 may also be implemented to transmit a warning message through a separate alarm function in addition to the display when it is necessary to urgently notify the user of the status of the machine tool (e.g., a situation just before a breakdown, etc.).

Figure 4:
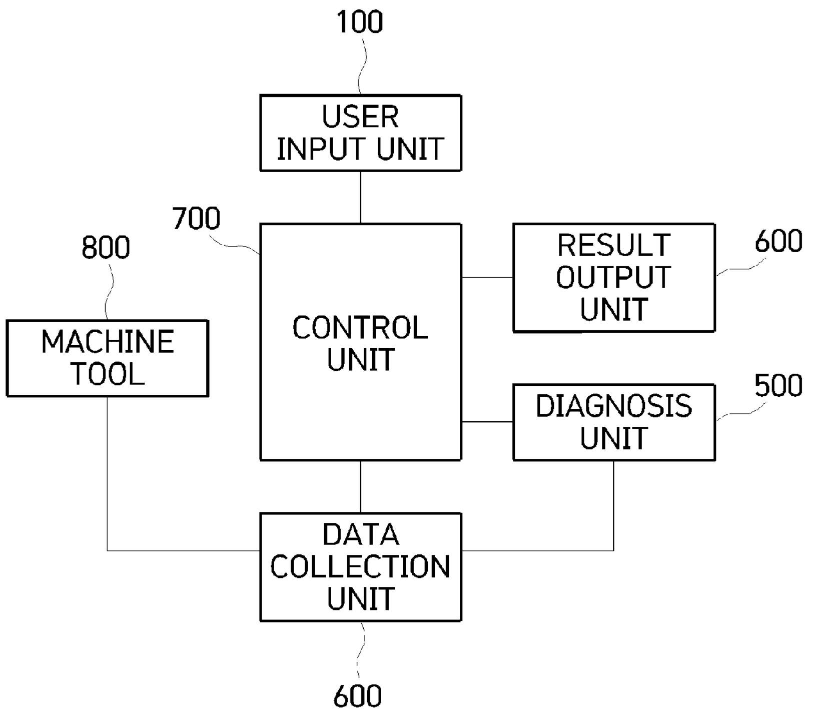
FIG. 4 is a configuration diagram of an apparatus for status diagnosis of machine tools according to another embodiment.

FIG. 4 illustrates a configuration of an apparatus for status diagnosis of machine tools according to another embodiment of the present invention.

In the embodiment of FIG. 2, the machine control unit 200 performs the diagnosis control function according to the present invention along with the original machine tool control function, but in this case, the machine control unit 200 has a great burden of simultaneously performing many tasks as briefly described above. In this embodiment, on the other hand, a separate control unit 700 dedicated to the diagnostic control function of the present invention is provided separately from the control of the machine tool. Since the machine tool performs independent control by itself, the machining operation of the machine tool and the diagnosis of the present invention may be performed quickly and efficiently. With respect to the embodiment of FIG. 4, characteristics that are distinguished from the embodiment of FIG. 2 will be described.

The control unit 700 performs a control function of the status diagnosis of the machine tool according to the present invention. For example, when performing the status or failure diagnosis of the spindle element of the machine tool between the first machining operation and the second machining operation according to the work contents received from the user input unit 100, the control unit 700 instructs a machine tool 800 to operate under the operating conditions for data collection (e.g., idling the spindle at 2000 RPM), and instructs the data collection unit 400 to collect vibration measurement data from a vibration sensor mounted on a spindle of the machine tool 800. The control unit 700 also controls the diagnosis unit 500 to perform the status or failure diagnosis using the collected data and return the diagnostic result to the control unit 700 (unlike this, the control unit 700 may control the diagnosis unit 500 to perform the status or failure diagnosis using the collected data and directly transmit the diagnostic result to the result output unit 600).

The diagnostic result derived through the data collection unit 400 and the diagnosis unit 500 returns to the control unit 700, and the result output unit 600 outputs the diagnostic result under the control of the control unit 700 and provides the diagnostic result to the user. According to another embodiment as described above, although not illustrated in the drawing, the diagnosis unit 500 may directly transmit the diagnostic result to the result output unit 600.

Functions of other components not described herein are almost the same as those of the embodiment of FIG. 2.

According to the present invention, by diagnosing a status or failure of machine tools in advance based on data collected during a time interval between machining operations of the machine tools from various sensors mounted on main elements of machine tools (spindle, feed system, driving system, etc.), it is possible to achieve a so-called zero down time that is to minimize a situation in which lines in a factory stop due to facility problems, and to save repair time and costs through early diagnosis.

In general, since machine tools performs machining operations for various materials into various forms, it takes a long time and high costs to collect data and develop diagnostic algorithms considering all cases. In addition, since a large amount of noise is mixed in data collected during the operation of the machine tools and there are various machining patterns, there is a limit in the accuracy of diagnosis. However, in the proposed present invention, by using data collected while operating machine tools under predefined specific conditions (e.g., idling a spindle at 2000 RPM) using a time interval between one machining operation and another machining operation, it is possible to more accurately perform diagnosis while reducing noise and reducing the time required for data collection for the development of diagnostic algorithm.

In addition, since status diagnosis is performed at a cycle set in advance by a user, and is also performed for a short time interval between machining operations, it is possible to minimize the non-productive operation time in which machining operation cannot be performed due to the time required to stop the machining operation to perform status diagnosis of machine tools in the past.

Figure 5:
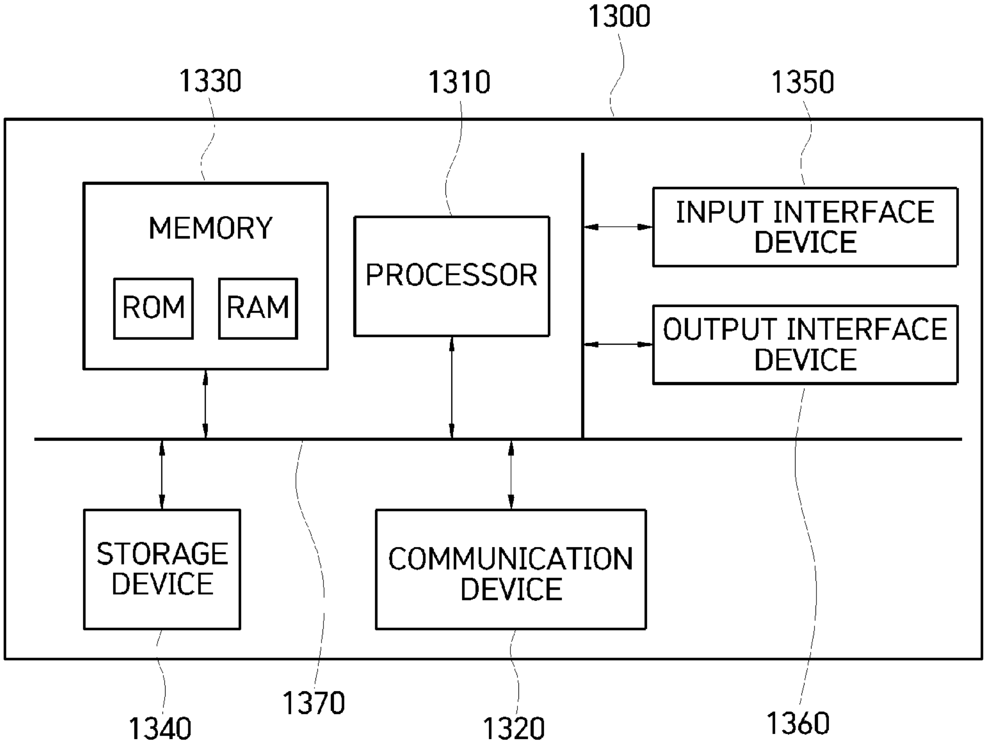
FIG. 5 is a block diagram illustrating a computer system that may be utilized to implement the present invention.

FIG. 5 is a block diagram illustrating a computer system for implementing the present invention described above.

Referring to FIG. 5, a computer system 1300 may include at least one of a processor 1310, a memory 1330, an input interface device 1350, an output interface device 1360, and a storage device 1340 that communicate with each other via a bus 1370. The computer system 1300 may also include a communication device 1320 coupled to a network. The processor 1310 may be a central processing unit (CPU) or a semiconductor device that executes instructions stored in the memory 1330 or the storage device 1340. The memory 1330 and the storage device 1340 may include various types of volatile or nonvolatile storage media. For example, the memory 1330 may include a read only memory (ROM) and a random access memory (RAM). In the embodiment of the present disclosure, the memory 1330 may be located inside or outside the processor 1310, and the memory 1330 may be connected to the processor 1310 through various known devices. The memory 1330 is a volatile or non-volatile storage medium of various types. For example, the memory 1330 may include a ROM or a RAM.

Accordingly, the present invention may be implemented as a computer-implemented method or as a non-transitory computer-readable medium in which computer-executable instructions are stored. In one embodiment, when executed by a processor, computer readable instructions may perform a method according to at least one aspect of the present disclosure.

In addition, the method according to the present invention can be implemented in the form of program instructions executable by a variety of computer components and may be recorded on a computer readable medium. The computer readable medium may include, alone or in combination, program instructions, data files and data structures. The program instructions recorded on the computer readable medium may be components specially designed for the embodiment of the present invention or may be known and usable by a skilled person in the field of computer software. The computer readable medium may include a hardware device configured to store and execute program instructions. For example, the computer readable record media include magnetic media such as a hard disk, a floppy disk, or a magnetic tape, optical media such as a compact disc read only memory (CD-ROM) or a digital video disc (DVD), magneto-optical media such as floptical disks, a ROM, a RAM, a flash memory, and the like. The program instructions include not only machine language code made by a compiler but also high level code that is executable by a computer through an interpreter and the like.

From the foregoing, embodiments in which the spirit of the present invention is specifically implemented have been described. However, the technical scope of the present invention is not limited to the above-described embodiments and drawings, but is defined by a rational interpretation of the claims.

What is claimed is:

1. A method of status diagnosis of a machine tool, comprising:

processing computer executable program code embodied in non-transitory computer readable storage media by one or more processors, the computer executable program code in response to execution by the one or more processors:

acquiring work contents including a command instructing a plurality of machining operations inherent in the machine tool, and diagnostic setup information including operating conditions for collecting sensor data for status diagnosis of the machine tool and a time interval between a first machining operation and a second machining operation included in the plurality of machining operations;

driving elements to be measured of the machine tool according to the operating conditions for collecting the sensor data included in the diagnostic setup information during the time interval included in the diagnostic setup information;

collecting the sensor data from one or more sensors mounted on the elements to be measured;

extracting a feature from the collected sensor data to generate training data;

training a learning model with the training data;

generating a diagnostic algorithm using the trained learning model;

performing a status diagnosis of the machine tool by applying the diagnostic algorithm to the collected sensor data; and outputting a result of performing the status diagnosis of the machine tool.

2. The method of claim 1, wherein the diagnostic setup information is included in information input by a user.

3. The method of claim 1, wherein the diagnostic setup information is included in information preset in the machine tool.

4. The method of claim 1, wherein the performing of the status diagnosis of the machine tool is performed using a diagnostic reference value as a criterion.

5. An apparatus for status diagnosis of a machine tool, comprising:

one or more processors that process computer executable program code embodied in non-transitory computer readable storage media, the computer executable program code comprising:

control unit program code that controls a control unit to acquire work contents including a command instructing a plurality of machining operations inherent in the machine tool, and diagnostic setup information including operating conditions for collecting sensor data for status diagnosis of the machine tool and a time interval between a first machining operation and a second machining operation included in the plurality of machining operations, and to drive elements to be measured of the machine tool according to the operating conditions for collecting the sensor data included in the diagnostic setup information during the time interval included in the diagnostic setup information;

data collection unit program code that controls a data collection unit to collect the sensor data from one or more sensors mounted on the elements to be measured;

diagnostic unit program code that extracts a feature from the collected sensor data to generate training data;

trains a learning model with the training data;

generates a diagnostic algorithm using the trained learning model; and controls a diagnostic unit to perform status diagnosis of the machine tool by applying the diagnostic algorithm to the collected sensor data; and result output unit code that outputs a result of performing the status diagnosis of the machine tool.

6. The apparatus of claim 5, wherein the control unit is included in a machine control unit in the machine tool.

7. The apparatus of claim 5, further comprising a user input unit configured to input the diagnostic setup information to the control unit.

8. The apparatus of claim 5, wherein the diagnostic setup information is included in information preset in the machine tool.

9. The apparatus of claim 5, wherein a result of the status diagnosis performed by the diagnosis unit is transmitted to the control unit.

10. The apparatus of claim 5, wherein the diagnostic unit performs the status diagnosis of the machine tool using a diagnostic reference value as a criterion.

* * * * *